United States Patent [19]

Hoffman

[11] 4,074,297
[45] Feb. 14, 1978

[54] DUPLEX CUT FILM HOLDER

[76] Inventor: Morris Hoffman, 19 Grand Ave., Farmingdale, N.Y. 11735

[21] Appl. No.: 741,931

[22] Filed: Nov. 15, 1976

Related U.S. Application Data

[63] Continuation-in-part of Ser. No. 493,074, July 30, 1974, abandoned.

[51] Int. Cl.² .................................................. G03B 17/26
[52] U.S. Cl. ..................................... 354/285; 354/278
[58] Field of Search ............... 354/276, 278, 279, 283, 354/284, 285

[56] References Cited

U.S. PATENT DOCUMENTS

| | | | |
|---|---|---|---|
| 238,669 | 3/1881 | Flammang | 354/285 |
| 607,054 | 7/1898 | Kimsey | 354/285 |
| 620,373 | 2/1899 | Stanley | 354/278 |
| 1,380,209 | 5/1921 | Hutchings | 354/285 |
| 1,641,420 | 9/1927 | Folmer | 354/285 |
| 2,451,638 | 10/1948 | Suydam | 354/285 |
| 3,373,673 | 3/1968 | Graig | 354/285 |

Primary Examiner—Edna M. O'Connor
Attorney, Agent, or Firm—Bauer, Amer & King

[57] ABSTRACT

A holder for so-called cut photographic film sheets into which the inserted film sheet is provided with an initial position that is readily manually achieved. Specifically, the sides of the film sheet during insertion are advantageously located beneath the overhang of lip structures which project from opposite sides into the film-receiving compartment of the holder. Thereafter, the frame of the holder is closed about the film sheet and, in the process, the film sheet assumes a final mounted position in the holder in which all four peripheral edges thereof are properly confined against movement.

4 Claims, 7 Drawing Figures

DUPLEX CUT FILM HOLDER

This is a continuation-in-part of U.S. Pat. application Ser. No. 493,074 filed July 30, 1974, entitled "Duplex Cut Film Holder", now abandoned.

The present invention relates generally to a photographic film sheet holder, and more particularly to improvements for such a holder which significantly facilitate the insertion therein and removal therefrom of so-called cut film sheets.

In the use of a photographic film sheet holder, it is highly desirable that the film sheet be very easily and readily inserted in the holder preparatory to photographic exposure of the film sheet and, thereafter, that it be readily and easily removed therefrom. In typical holders, either for rigid photographically sensitized plates or flexible cut-to-size film sheets, one end of the four-sided frame which defines or bounds the film-receiving compartment is appropriately moved to a clearance position so that the plate or film sheet can be inserted into the compartment. After this positioning of the film is achieved, the temporarily removed frame member is then again moved back into holding contact with the film sheet or plate, as the case may be. Exemplifying a typical photographic plate holder as just described is the plate holder which is the subject of U.S. Pat. No. 620,373. In the contemplated method of inserting and removing the film plate or sheet using a typical prior art holder as just described, it is of course necessary that in order to provide access to the film-receiving compartment to move one of the frame members to a sufficiently remote clearance position so that there is no interference or obstacle presented to inserting the film or plate into the compartment and removing it therefrom. The cost of constructing a prior art holder is increased as well as rendered more complicated because of the requirement to allow for movement of one of the frame members between its clearance and film-holding operative positions.

Broadly, it is an object of the present invention to provide an improved holder for a cut film sheet overcoming the foregoing and other shortcomings of the prior art. Specifically, it is an object to provide a film sheet holder in which the film sheet is manually positioned therein beneath film-holding projections which bound the film-receiving compartment, and then these projections are advantageously additionally used to subsequently accurately guide the film sheet through movement which results in its complete engagement on all four sides. That is, in accordance with the present invention, the film sheet has an initial position within the holder which is readily achieved manually, and subsequently said film sheet is provided with additional movement into an appropriate operative mounted position within the frame. In this connection and most important, the movement which the film sheet partakes of to assume its mounted position is accurately controlled and achieved by using to advantage the frame structure which holds the film sheet in place within the holder during the contemplated photographic use of the holder.

A photographic film sheet holder demonstrating objects and advantages of the present invention includes a pair of opposite side frames and an end frame which cooperate with each other to define a three-sided frame housing bounding a film-receiving compartment. Positioned, as by a friction fit or the like, to each of these frames are a corresponding pair of opposite side frame inserts and an end frame insert, all of which inserts have a film-holding lip extension means thereon projected into the film-receiving compartment in a strategic location about the periphery thereof for establising holding contact with a film sheet that is inserted into the compartment. Further, each of the lip extension means on the opposite side inserts has adjacent one end a film-inserting slot of a sufficient length and size which facilitates the insertion of the film sheet through the slot into the compartment. Initially, the inserted film assumes a position in which it is slidably held beneath the length of the lip extension means which extends beyond the film-inserting slots of the side inserts. Completing the holder is a slidably disposed positioning member which is mounted in spanning relation across the open end of the three sided frame, which member is movable from a clearance position through a film sheet positioning stroke into the compartment. Accordingly, the positioning member establishes pushing contact against an end of the film sheet and urges this film sheet during the positioning stroke into a final operative position in the compartment in which the peripheral edges of the film sheet are all appropriately and properly engaged, said engagement being with the lip extension means not only on the opposite side inserts but also on the bottom insert which the end of the film sheet is advantageously positioned beneath as a result of the movement thereof during the referred to positioning stroke.

BRIEF DESCRIPTION OF THE DRAWING

In the various figures of the drawing like reference characters designate like parts. In the drawing.

METHOD OF INSERTING AND REMOVING THE CUT FILM SHEET

Figure 1:
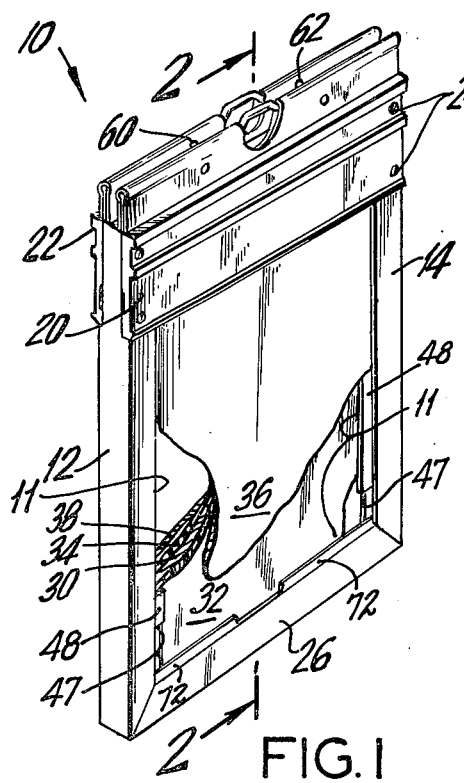
FIG. 1 is a perspective view of the double cut film holder comprising the present invention with portions broken away.

Before proceeding with a detailed description of the construction of a preferred embodiment of a holder according to the present invention, it is believed that it would be helpful to describe, particularly in connection with FIGS. 1-4, the contemplated method in which a film sheet 34 is inserted and removed from the holder 10. It is this insertion and removal, in a significantly faciliated manner, which constitutes the essence of the within invention. In this connection, and as will be described in detail subsequently, holder 10 is constructed to include, at least in part, a four sided frame, which bounds a centrally located film-receiving compartment 11. Three of these frame members, namely side frames 12 and 14, and end frame 26, function primarily as mountings for inserts 40, 42 and 18 which, in turn, have appropriate structural features for engaging with the peripheral edges of the cut film sheet 34 which is inserted in the compartment 11. The fourth frame member 16 primarily serves as a mounting for pins 62 of a slidably disposed member 64 which is movable between a clearance position and an operative position with respect to the film-receiving compartment 11. The effect of these positions will soon become apparent.

Figure 3:
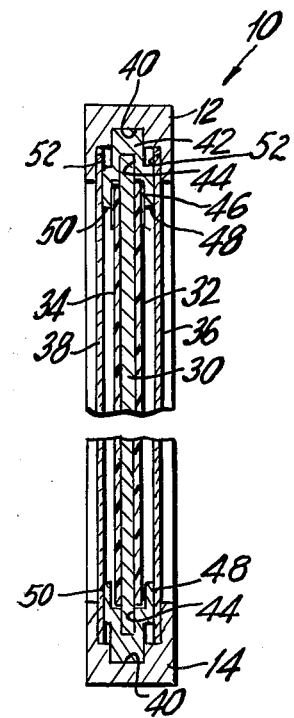
FIG. 3 is a fragmentary, sectional plan view taken along line 3—3 of the FIG. 2.

As is perhaps best shown in FIG. 3, the insert 42 for frame 12 and the insert 40 for frame 14, each has a central groove 44 or a centrally disposed partition plate 30 and, more important each said insert has a lip 48 therealong which extends into the film-receiving compartment 11. It is the overhang of these lip extensions 48 along the peripheral edges of the film sheet which effectively hold the same in place during use of the holder 10.

The lip extensions 72 of the insert 18 for the frame 26 can be more readily seen in FIG. 1, to which figure reference should be made. Also, as clearly shown in this figure, bottom portions of the lip extensions 48 of the inserts 40 and 42, namely the ends thereof adjacent to the frame member 26, are removed to provide insert openings 47 into the film-receiving compartment for the cut film sheet. Thus, as clearly shown in FIG. 4, the cut film sheet 34 is readily inserted through the insert slots 47 into the film-receiving compartment 11 so that the side edges of the film sheet are strategically located beneath lip extensions 48 which extend forwardly of the film-inserting slots 47. During insertion of the film sheet 34, it will be understood that the pins 60 are in their retracted position and that therefore member 64 is also in its fully retracted position, all as is clearly shown in FIG. 4. It is contemplated that film sheet 34 be inserted to the fullest extent possible beneath the side lip extensions 48 which, of course, would be when the film end 35 abuts against the transversely oriented member 64. Once this is achieved, pins 60 are then depressed which has the desired result of urging the member 64 through movement from right to left as viewed in FIG. 4, which movement may properly be characterized as a film sheet positioning stroke 61 in that it effectively moves the opposite end of the film sheet, namely that designated 37, into a desirable position in which it is projected beneath the overhanging lip extension 72 of insert 17. During this positioning stroke, it should be noted that the side lip extensions 48 are advantageously used as movement-guiding means for the film sheet to insure that the film end 37 moves properly beneath the end lip extension 72. In this way, the film sheet 34 readily assumes an operative position within the holder 10 in which all four peripheral edges are properly engaged or confined against movement.

After photographic exposure of the film sheet 34, the removal thereof from the holder 10 is also achieved in a simple faciliated manner. From the description already provided, it should be readily understood that the removal procedure is essentially the reverse of the procedure used for inserting the film. More particularly, the pins 60 are withdrawn thereby correspondingly withdrawing or retracting the member 64. Film sheet 34 is then readily manually removed from left to right, as viewed in FIG. 4, which has the effect of moving the film end 37 into an area coextensive with the slots 47. In this accessible position, the user can readily grasp the film end 37 and then complete the removal of the film sheet 34 from the beneath the side lip extensions 48.

DESCRIPTION OF THE PREFERRED EMBODIMENTS

Figure 2:
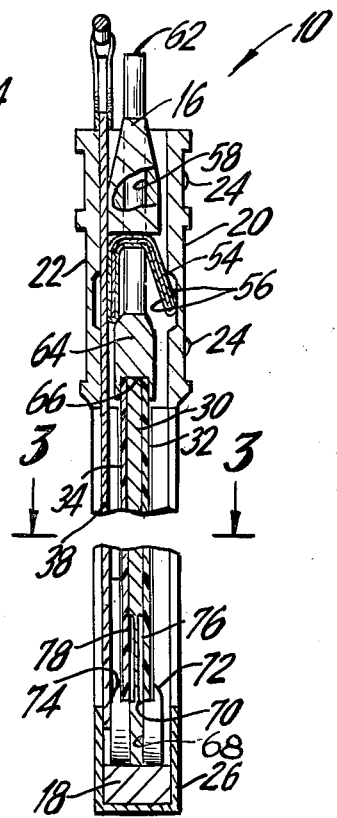
FIG. 2 is a fragmentary, sectional, elevational view taken along line 2—2 of FIG. 1.

Referring now particularly to FIGS. 1 and 2. It will be seen that the double cut film holder 10 comprising the present invention includes right and left-hand side rails 12 and 14 which are identical to each other and of which only one will be described in the interest of brevity. There are also provided an upper transverse end rail 16 as well as a lower transverse end rail 26. Upper, front and rear retaining plates 20 and 22 are used to secure the upper end rail 16 and the two side rails 12 and 14 by means of any suitable fasteners such as indicated by the reference characters 24. The lower end rail 26 is secured to the side rails 12 and 14 by any appropriate means. Also shown in FIG. 1 is the opaque central partition plate 30, the front and rear sheets of cut film 32 and 34, respectively, as well as the front and rear dark slides 36 and 38, respectively.

The construction of the duplex cut film holder 10 comprising the present invention will now be described in further detail in conjunction with FIG. 2 and with FIG. 3. Turning first to FIG. 3 it will be seen that the side rail 12 is provided with a centralized, vertically extending friction fitting insert or inner guide rail 42. A first central groove 44 of relatively narrow width is framed along the length of the inner guide rail 42 in order to accept the vertical side edges of the central partition plate 30. A second, wider groove 46, which defines the previously noted lip extensions into the compartment 11 or inner and outer legs 48 and 50, is also formed in the inner guide rail 42 so that the side edge of the cut film sheets 32 and 34 may be positioned between the legs 48 and the central partition plate 30 and the legs 50 and the central partition 30, respectively.

It should be noted at this time that the inner side rails 42 may be formed integrally with their respective outer side rails 12 and 14. If this alternative construction is followed then of course the grooves 40 could be eliminated but the grooves 44 and the legs 48 and 50 would still be necessary in order to receive the central partition plate 30 and to define recesses for accepting the sheets of cut film 32 and 34. It will also be noted in FIG. 3 that a second groove 52 is formed in the outer side rail 12 in order to define, in cooperation with the legs 48 and 50 of the inner guide rail 42, a pair of inner and outer channels for receiving the dark slides 36 and 38.

Referring now to FIG. 2 it will be seen that the upper end rail 16 is provided with an inverted, generally U-shaped or V-shaped light trap which includes a transverse, resilient spring-like member 54 that is covered with a black cloth 56. The light trap may be secured to the underside of the upper end rail 16 in any suitable manner. The upper end rail 16 is also provided with two vertically extending bores 58 that are arranged to slidably receive vertically oriented pins 60 and 62. A vertically displaceable, transversely oriented film clamp member 64 is secured to the lower end of each of the pins 60 and 62 for movement together therewith. As shown for example in FIG. 2, the inner edge of the clamp member 64 is provided with a transverse groove or channel 66 for receiving the upper transverse end of the central partition plate 30 and the two sheets of cut film 32 and 34. As shown best in FIG. 2 the light trap 54, 56 effectively seals the space or recess formed between the front and rear dark slides 36 and 38, respectively, and the inner and outer surfaces of the transverse clamp member 64.

As also shown in FIG. 2, the lower, transverse end rail 26 is also provided with an insert 18 having a first central groove 68 that extends transversely. That is, the groove 68 extends between the side rails 12 and 14 of the film holder 10 in order to receive the lower transverse edge of the central partition plate 30. A second transverse groove 70 is also formed in the lower guide rail 18 in order to define transversely extending front and rear lip extensions or legs 72 and 74 whereby the lower edge of the cut film sheets 32 and 34 may be positioned, respectively, between the leg 72 and the central partition plate 30 and the leg 74 and the central partition plate 30. The lower edge of the dark slides 36 and 38 are received, respectively, in the spaces defined by the outer and inner surfaces of the lower end rail insert 18 and the respective, oppositely facing, opposed surfaces of the U-shaped channel member 26.

At this time it should be noted that recesses 76 and 78 are formed respectively, on the front and rear surfaces of the central partition plate 30 proximate the lower end thereof. It should also be noted at this time that the legs 48 and 50 of the inner guide rail 42 terminate at a location that is spaced upwardly of the lower end rail 18 to provide the previously noted slots 47 communicating with the film-receiving compartment 11. The purpose for this construction will now be described in connection with FIG. 4.

Figure 4:
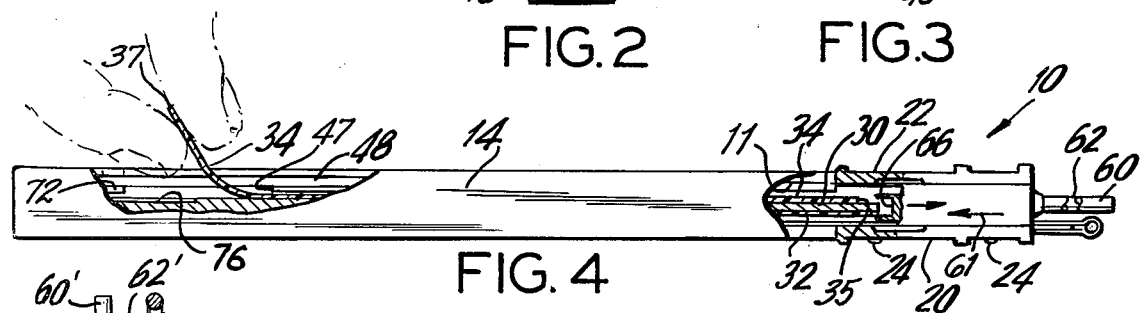
FIG. 4 is a side elevational view, partially broken away, illustrating the method of use of the present invention.

The sheets or cut film 32 and 34 are unloaded from the holder 10 by pulling the pins 60 and 62 in an upward direction such as shown in FIG. 1 or to the right as shown in FIG. 4. The pins 60 and 62 slide loosely within the bores 58 formed in the upper end rail 16 and thereby pull the film clamp member 64 in the same direction. When the pins 60 and 62 are pulled as just described, the base of the transverse, film engaging groove 66 will then be displaced from the upper edge of the central partition plate 30 as well as the upper edges of the cut sheets of film 32 and 34. With the dark slides 36 and 38 drawn out in the usual manner the cut sheets of film may then be moved upwardly (FIG. 1) or to the right (FIG. 4) so that they once again abut the base of the groove 64 in the clamp member 64. The lower edge of the cut film 32 and 34 may then be grasped as shown in FIG. 4 and lifted out. To facilitate the grasping operation, the recesses 76 and 78 are formed in the central partition plate 30. To further facilitate this operation the legs 48 and 50 of the inner guide rails 42 terminate at a location spaced upwardly from the lower guide rail 18, as described above and as shown for example in FIG. 4.

The loading of the film uses just the reverse sequence of operation. That is, the pins 60 and 62 are initially in their outward or upper position and the dark slides are either completely removed or in their outward positions. The cut sheets of film 32 and 34 may then be deposited on the opposing surfaces of the central partition plate 30 and oriented in the channels defined by the legs 48 and 50 of the inner guide rails 42 and the opposed surfaces of the central partition plate 30. The pins 60 and 62 are then moved downwardly (FIG. 1) or inwardly (FIG. 4) and the dark slides are inserted in their usual manner.

Figure 5:
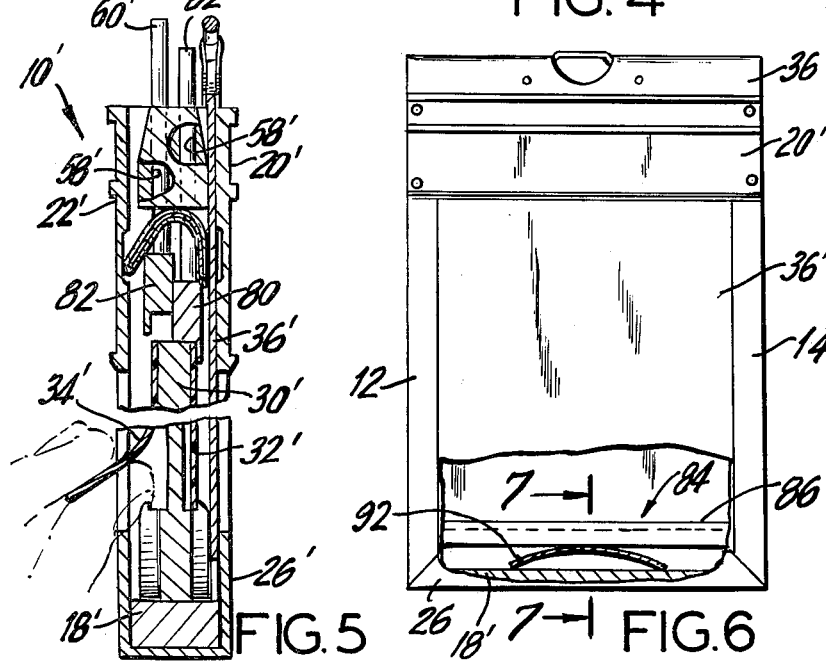
FIG. 5 is a fragmentary elevational view, in section, illustrating an alternative embodiment of the present invention.

An alternative embodiment designated by the reference character 10' is shown in FIG. 5. Where the components of the FIG. 5 embodiment are the same as the embodiment shown in FIGS. 1-4, primed reference characters will be used. The basic difference between the first and second embodiments resides in the construction of the displaceable film clamp member. Whereas in the first embodiment shown in FIGS. 1-4 a single film clamp member 64 was used for both sheets of cut film 32 and 34, the embodiment shown in FIG. 5 utilizes separate front and rear film clamp members 80 and 82. The pin 60' is secured to the front film clamp member 80 while the pin 62' is secured to the rear film clamp member 82. In the embodiment shown in FIG. 5 the pins 60' and 62' are manipulated separately in order to load and unload the cut sheets of film 32' and 34' whereas in the first described embodiment of FIGS. 1-4 both pins 60 and 62 are moved simultaneously.

All other constructional features of the embodiment shown in FIG. 5 are the same as that shown and described in connection with the embodiment of FIGS. 1-4.

Figure 6:
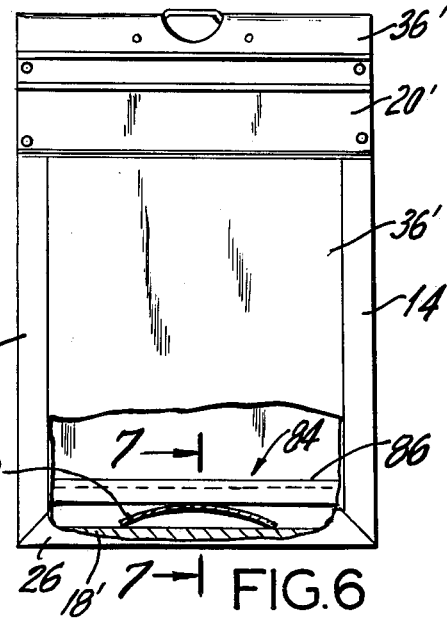
FIG. 6 is an elevational view partially broken away and partially in section, illustrating still another alternative embodiment of the present invention.
Figure 7:
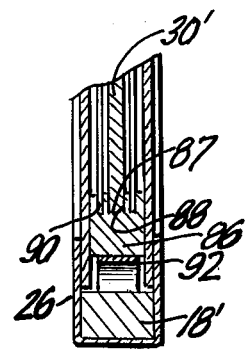
FIG. 7 is a fragmentary, sectional, elevational view taken along line 7—7 of FIG. 6.

Another alternative embodiment of the present invention is illustrated in FIGS. 6 and 7. Whereas in the first and second described embodiments the displaceable film clamp member was located at the top end of the cut film holder either 10 or 10' in the embodiment shown in FIG. 6 and in FIG. 7 a lower film clamp member, generally, designated by the reference character 84 is employed. The lower film clamp member 84 is comprised of a transversely positioned film clamp bar 86 along the upper, transverse edge of which is formed a central groove 87 for receiving the central partition plate 30'. Front and rear legs 88 and 90 are also formed in the upper transverse edge of the film clamp member 86 in a spaced parallel relationship to the central groove 87 in order to receive the front and rear sheets of cut films 32' and 34', respectively. Positioned intermediate the lower transverse surface of the film clamp bar 86 and the upper, opposed surface of the lower end rail 18' is a bowed, leaf spring 92 that normally urges the bar 86 in an upward direction, to a first position. In order to utilize the embodiment shown in FIG. 6 and in FIG. 7, the dark slides 36' and 38' are moved upwardly and the film clamp bar 86 is moved downwardly against the force of the bowed leaf spring 92. This action frees the lower transverse edge of the sheets of cut film 32 and 34 so that they may be lifted out in the manner described hereinabove. The loading operation of this last mentioned embodiment is just the opposite of the unloading operation which was just described.

From the foregoing description and from the drawing it will be evident that an improved double cut film holder has been provided which contributes to greatly facilitated loading and unloading of the cut film 32, 34. This is achieved by providing the film with an initial easily manually achieved position, wherein it is inserted against the retracted member 64, and then using the closing movement 61 of this member into the compartment 11 to complete the positioning of the film, wherein it is inserted beneath the bottom lips or legs 72, 74. As already noted, during this insertion, the side lips or legs 48, 50 properly guide the film so that it cannot fail to be projected beneath the legs 48, 50.

There has been disclosed heretofore the best embodiment of the invention presently contemplated. However, it is to be understood that various changes and modifications may be made thereto without departing from the spirit of the invention. three-sided film-holding

What is claimed is:

1. A photographic film sheet holder adapted for facilitated removable insertion therein of a sized photographic film sheet preparatory to photographic exposure of said film sheet, said holder comprising a pair of opposite side frames and an end frame cooperating to define a three-sided frame housing bounding a film-receiving compartment, a corresponding pair of opposite side frame inserts and an end frame insert having operative positions disposed in said three-sided frame housing, each of said inserts having film-holding lip extension means thereon projected into said film-receiving compartment about the periphery thereof for establishing holding contact with a film sheet inserted into said compartment, each of said lip extension means on each said opposite side insert having in the end adjacent said end insert a film-inserting slot formed therein of a selected length so as to facilitate the insertion of said film sheet therethrough into said compartment into an initial position of being slidably held beneath the length of said lip extension means extending beyond said film-inserting slot thereof, and a slidably disposed positioning member mounted in spanning relation across said three-sided frame housing open end movable from a clearance position through a film sheet positioning stroke into said compartment, whereby said positioning member establishes pushing contact against an end of said film sheet and urges same during said positioning stroke into an operative position in said compartment in which the peripheral edges of said film sheet are in engaged relation with said lip extension means of said opposite side and bottom inserts.

2. A photographic film sheet holder as claimed in claim 1 wherein said inserts have additional film-holding lip extension means in spaced apart relation thereon, and said holder includes a partition disposed centrally thereof to thereby provide two back-to-back film-receiving compartments.

3. A photographic film sheet holder as claimed in claim 2 wherein said opposite side frame inserts include grooves in clearance positions from said central partition for slidably receiving therein a pair of protective plates for said film, and said positioning member includes a downwardly oriented outwardly diverging flexible member which is pressed into said film-receiving compartments from opposite sides against said film positioned therein incident to said sliding movement of said protective plates into said holder.

4. A photographic film sheet holder as claimed in claim 2 wherein said lip extension means have a clearance position spaced from said central partition to define said back-to-back film receiving compartments, and portions to said lip extension means of said opposite side frame inserts are removed at the ends adjacent said end frame insert to define insert and removal slots relative to said film-receiving compartments.

* * * * *